United States Patent [19]

Barratt

[11] Patent Number: 5,199,358
[45] Date of Patent: Apr. 6, 1993

[54] VEHICLE GUIDEWAY AND SYSTEM FOR MASS TRANSPORTATION

[76] Inventor: Peter J. M. Barratt, 2409 S. Miami Ave., Miami, Fla. 33129

[21] Appl. No.: 796,617

[22] Filed: Nov. 22, 1991

Related U.S. Application Data

[63] Continuation-in-part of Ser. No. 636,266, Dec. 31, 1990, abandoned.

[51] Int. Cl.$^5$ .............................................. B61F 13/00
[52] U.S. Cl. .................................... 104/139; 105/1.2; 105/72.2; 105/215.1
[58] Field of Search ............... 104/139, 140, 145, 245; 105/1.1, 1.2, 26.05, 26.1, 49, 72.2, 215.1

[56] References Cited

U.S. PATENT DOCUMENTS

| | | | |
|---|---|---|---|
| 3,207,085 | 9/1965 | Burr | 105/72.2 |
| 3,532,060 | 10/1970 | Brush | 104/139 |
| 3,763,789 | 10/1973 | Olson et al. | 105/72.2 |
| 4,199,185 | 4/1980 | Woolcock | 105/1.2 |
| 4,841,871 | 6/1989 | Leibowitz | 104/139 |
| 4,941,406 | 7/1990 | Lay | 105/1.2 |

FOREIGN PATENT DOCUMENTS

0290767 11/1990 Japan ................................. 104/139

Primary Examiner—Douglas C. Butler
Assistant Examiner—Mark T. Le
Attorney, Agent, or Firm—John P. Halvonik

[57] ABSTRACT

The invention is a novel transit system in which vehicles are piggybacked onto electrically operated upper sled modules for longer distances or between critical high volume areas such as city centers and airports. The front wheels of the Electric vehicles (EVs) in this system are carried on an upper sled module which is connected by a strut or fin to a lower airfoil wing travelling in a generally below grade duct or conduit. The EV uses its own power to move the articulated unit from co-axial AC and DC motors supplemented by a parallel power supply and signals system. Vehicles mounted on the sled units are automatically spaced in response to central computerized timing and speed controls so as to ensure proper separation of vehicles using the guideway. Piggybacked vehicles can quit the guideway at predetermined nodal points to revert to conventional vehicular travel on the public highway system.

4 Claims, 8 Drawing Sheets

VEHICLE GUIDEWAY AND SYSTEM FOR MASS TRANSPORTATION

This is a continuation in part of Ser. No. 636,266, filed Dec. 31, 1990, now abandoned.

BACKGROUND OF THE INVENTION

1. Field of the Invention

The invention relates to a unique transit system which has application to all forms of automotive private tranportation. Because of cost, pollution, environmental damage, depletion of non-renewable resources, increasing safety concerns and so on, private transportation by means of the internal combustion engine (ICE) is approaching a crisis if not its demise. This invention features the electric vehicle (EV) which meets most of the criteria as suitable and acceptable private transportation. However, EVs have a serious defect in terms of their speed and range. Even the so-called hybrid vehicles which have supplementary power supplied by an ICE are at best, a short term palliative.

The invention addresses the larger problems of private transportation for the future, particularly intercity and in corridors of urban areas. The invention is intended to drive electrical hybrid or conventional internal combustion engines (ICE) to mount its forward wheels by means of a built-in ramp onto the sled.

Once fully mounted, the car is restrained by a positioning lug below the front bumper and an electrical/signal connection is made at the same time. The hinged ramp is then manually raised (later servo-assisted) and solenoid activated bolts on either side of the vehicle are engaged to lock the ramp, and thus the sled unit, firmly to the vehicle.

2. Description of the Prior Art

While there are similar mass transportation systems that are known, none that applicant is aware of utilize the underground conduit or the phenomenon of ground effect to achieve aerodynamic lift for the transporting vehicles.

SUMMARY OF THE INVENTION

The invention utilizes a box-shaped guideways, a lower air foil section (wing) that rides along grooves in the side walls of the guideway and an upper sled connected to the lower section by a strut that supports the two front wheels of vehicles e.g. hybrid, ICEs and EV's along the guideway to and form nodal points and centralized terminals.

The lower airfoil section fits into the guideway and also provides the electric power necessary to supplement the power provided by the aerodynamic forces generated by the sled and airfoil combination. The sled and airfoil combination accelerates to speeds within the guideway that are fast enough to create aerodynamic forces that supply lift to the aerodynamic sled. This, in turn, increases speed over conventional vehicles, saves on the fuel and energy needed to power the vehicles and the guideway itself provides a safer guidance system than existing highways and streets.

The central feature of the invention is the continuous reinforced concrete guideways. In the application to (mainly) private transportation it would take the form of a continuous (normally underground) box shaped section to serve as a guideway. Though as a more economic alternative, a grade level continuous I beam might comprise the guideway permitting the same characteristics as indicated above. If required, the guideways can be at grade level, elevated on pylons.

In the mass public application the guideway would normally utilize continuous C-shaped section grade level precast, post-tensioned concrete beams as guideways, again the cavities would face each other. In both cases, the guideways would utilize the speed of the vehicle to benefit from the ground effect to create lift and thus reduce weight.

If required, the guideways can be elevated on pylons to run through tunnels. Providing that the same profile is maintained, the guideway construction could also be of structural steel, reinforced concrete, special polymers, or a combination of all three.

A primary objective of the invention is to improve the safety of private and public transportation by the use of an automated guideway system.

One objective of the invention is to reduce the cost and enhance the convenience of private transportation.

Another is to reduce the pollution caused by transportation vehicles.

Another is to improve the safety of private and public transportation by the use of an automated guideway system.

Another is to improve vehicular maintenance by standardization of design which would also improve the parking and storage of such vehicles (possibly by articulation or stacking or a combination of the two).

Another is to increase the speeds attained by subjecting the vehicle to a computer controlled guideway system.

Yet another is to eliminate driving fatigue and corresponding waste to human energy by the use of mass private transportation.

Still another is to combine the aerodynamic phenomena of 'lift' obtained from an airfoil and 'ground effect' when such airfoil is employed in close proximity to the ground and especially when such aerodynamic forces are employed in the controlled volume of an enclosed duct.

Other advantages of the invention could be readily apparent to those skilled in the art once the invention has been described.

DESCRIPTION OF THE PREFERRED EMBODIMENT

The invention relates to the field of modern mass consumer transportation and in particular to a system of transportation that may supplement or replace existing ICE powered vehicles.

The private transportation system uses a biplanar sled that is mounted within a duct or guideway 1 that carries consumer vehicles from centralized loading and unloading points (nodal points) 38, 40. The sled units are composed of two sections, one section 8 above the guideway and the other section 2 within the confines of the guideway. Section 8 is a vehicular carrying portion that transports consumer vehicles, "piggy back" style, to nodal points. Section 2 in the guideway is an airfoil 'wing' that is connected to section 8 by a support strut or stabilizer 10.

When the airfoil section attains high speeds within the guideway it is capable of 'flying' within the continuous duct benefitting from ground effect and other aerodynamic lift forces. The airfoil is guided and supported by double bearing or counter-rotating wheels 16. The upper sled which is also a lift force would carry a totally standardized electric vehicle which would provide the motive power from its rear wheel drive.

The upper sled acts as the piggyback carrier and transports the electric vehicle or other privately or corporately owned and operated vehicles from the centralized loading and unloading points to nodes and vice versa. The upper unit consists of a hinged and moulded ramp 24 constructed of composite plastic and carbon fibre. This unit is mounted on a support strut 10 which in turn is connected to the lower sled or airfoil 'wing'.

The general idea behind the private transport system of the present invention is to achieve lift culminating in take-off of the sled unit within the confines of a continuous duct that supports the sled. This may be called "controlled take off" and it follows that it could be applied to other forms of vehicular transport.

Figure 4:
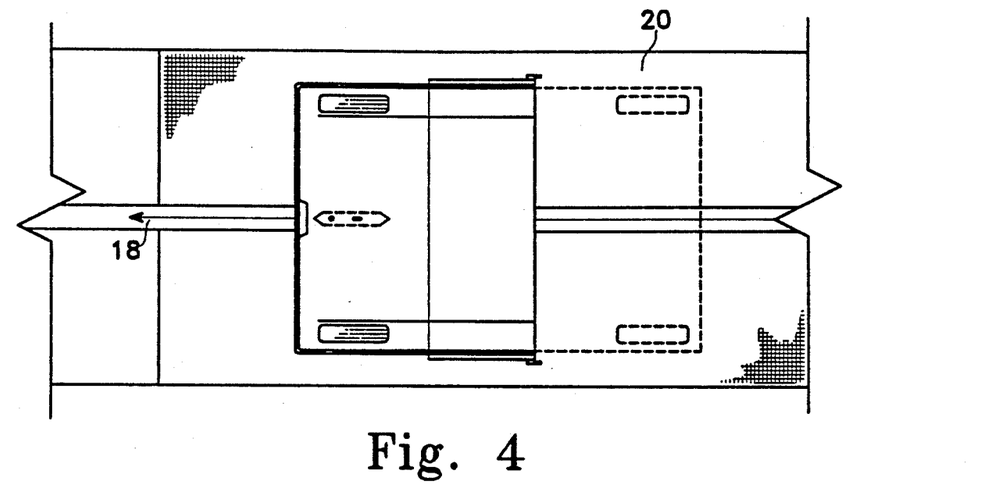
FIG. 4: plan view of sled unit above guideway showing location of Ev wheels (note steel grille and support block which occurs at loading, maintenance points and switch points)
Figure 5:
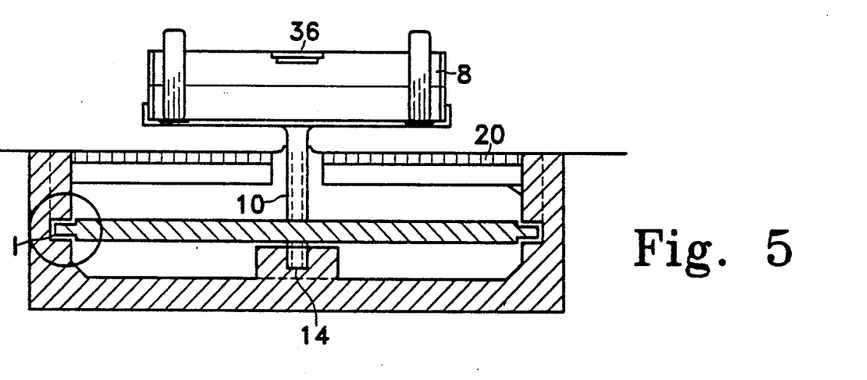
FIG. 5: section through guideway showing support block (positioned above support block) and access grille
Figure 6:
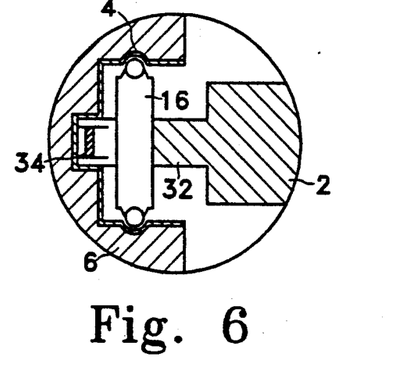
FIG. 6: detail of side grooves (counter rotating wheels shown in FIG. 11 might be used as an alternative)

The lift generated will support the forward portion of the sled unit and piggy-backed vehicle while it is at the same time in almost frictionless contact with the walls of the continuous duct. As shown in FIG. 5 and 6, the lower sled unit contacts the walls of the guideways through an indentation in the sides of the trackway. The lower sled has an axle 32 and a pair of double bearing steel wheels 16, each wheel located at one side of the sled. The wheels fit into lateral slots 4 located at each side of the guideway and running continuously through the entire length of the guideway as shown in FIG. 4. The slots are indented slightly as shown in FIG. 6. The slots are indented to provide a secure riding surface for the tapered portions of the wheels of the lower sled.

The outward edges of the wheels are slightly pointed or otherwise tapered on their outside perimeter. This is so that the wheels may ride securely within the confines of the indentations. The outside hub of the wheel contains an electrical connecting plate or conductor 34. This conductor maintains contact with the indentations and provides minimum friction. The outside edge of the tapered slot contains an electrically conductive surface also running the entire length of the guideway.

Figure 11:
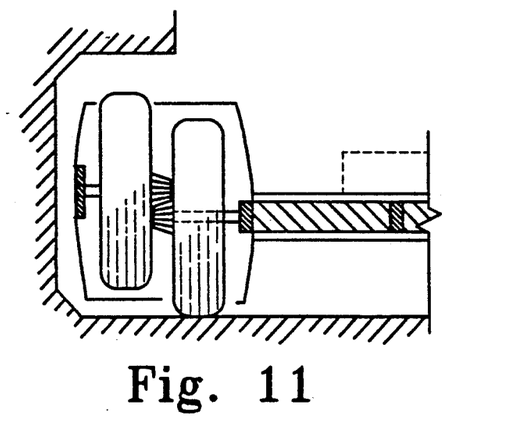
FIG. 11: Detail of counter-rotating wheels
Figure 12:
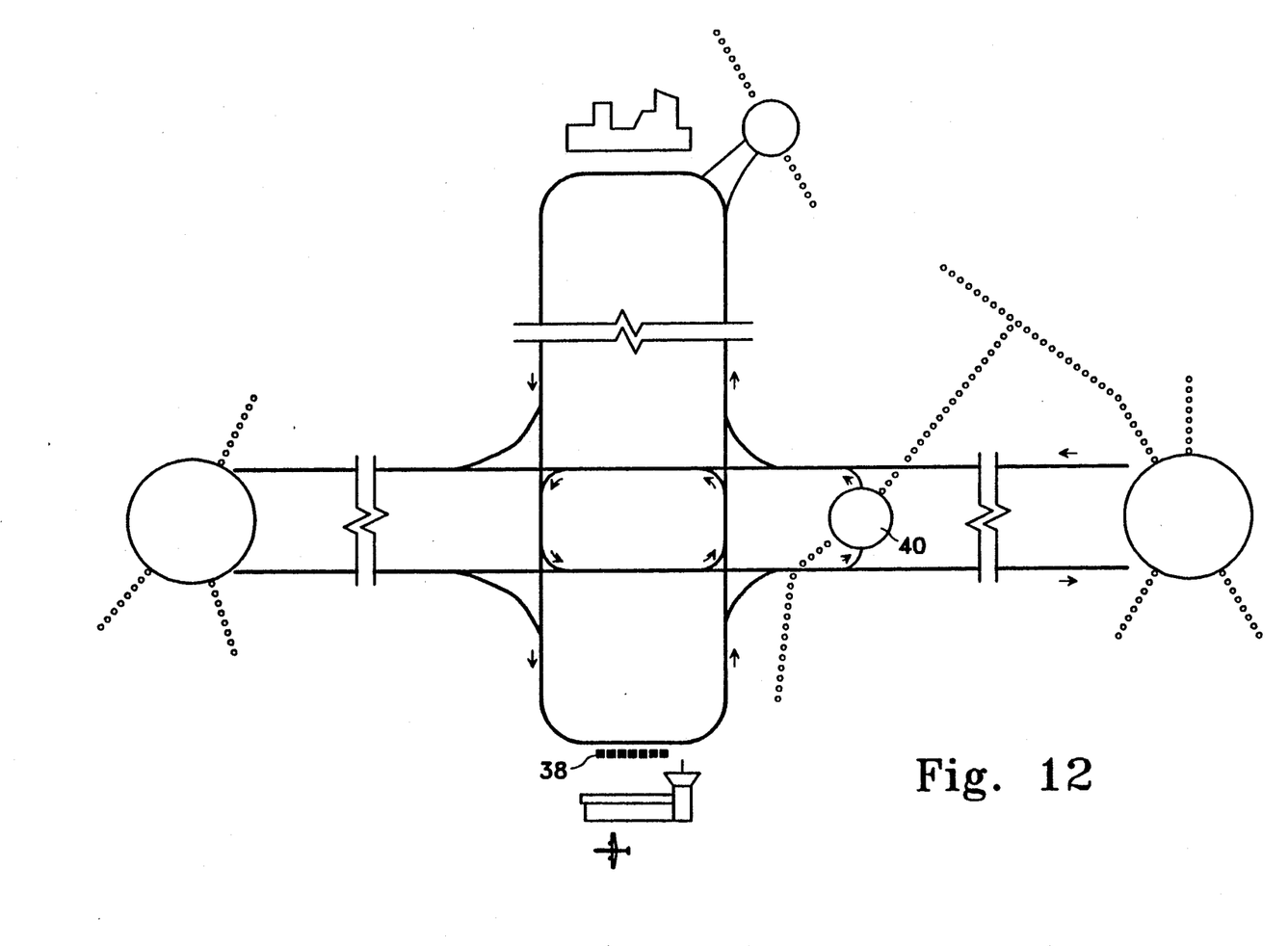
FIG. 12: Diagrammatic layout of guideway network showing airport to city and region
Figure 13:
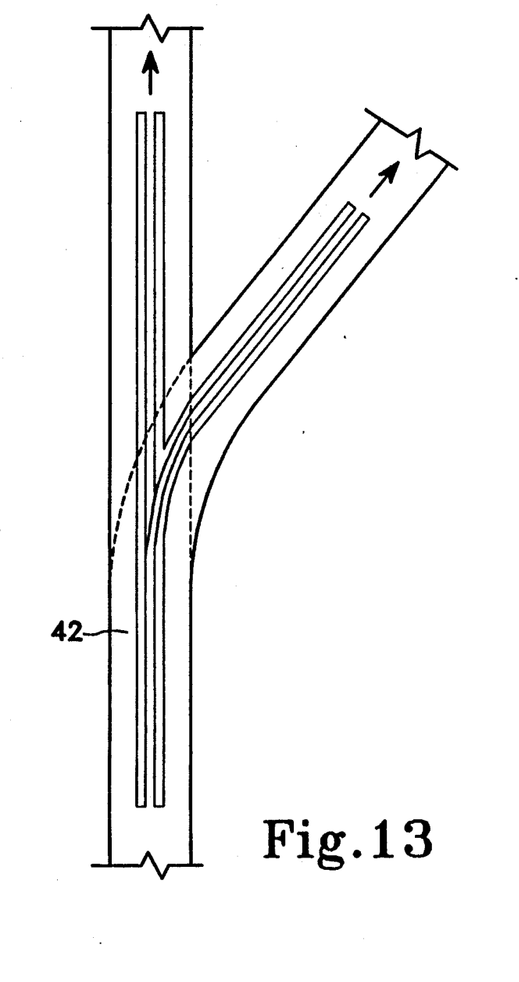
FIG. 13: Plan view of switch arrangement inside guideway.
Figure 14:
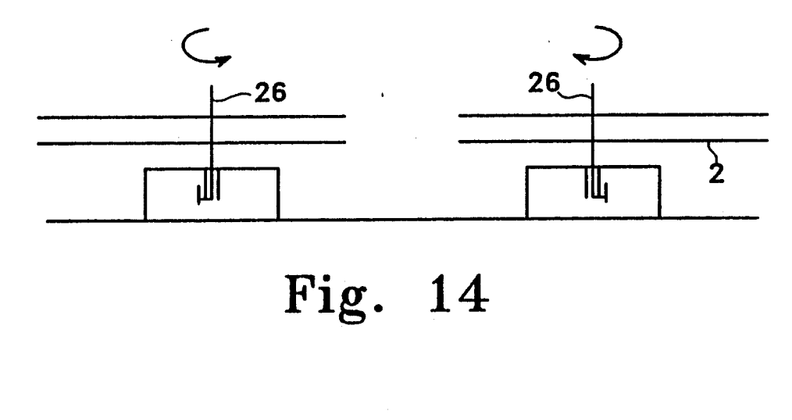
FIG. 14: Section of switch blocks showing arrangement for right and left views FIG. 15A and B: Diagram of 4 way switch utilizing segmented or bending beam for grade level alternative.
Figures 15A, 15B:
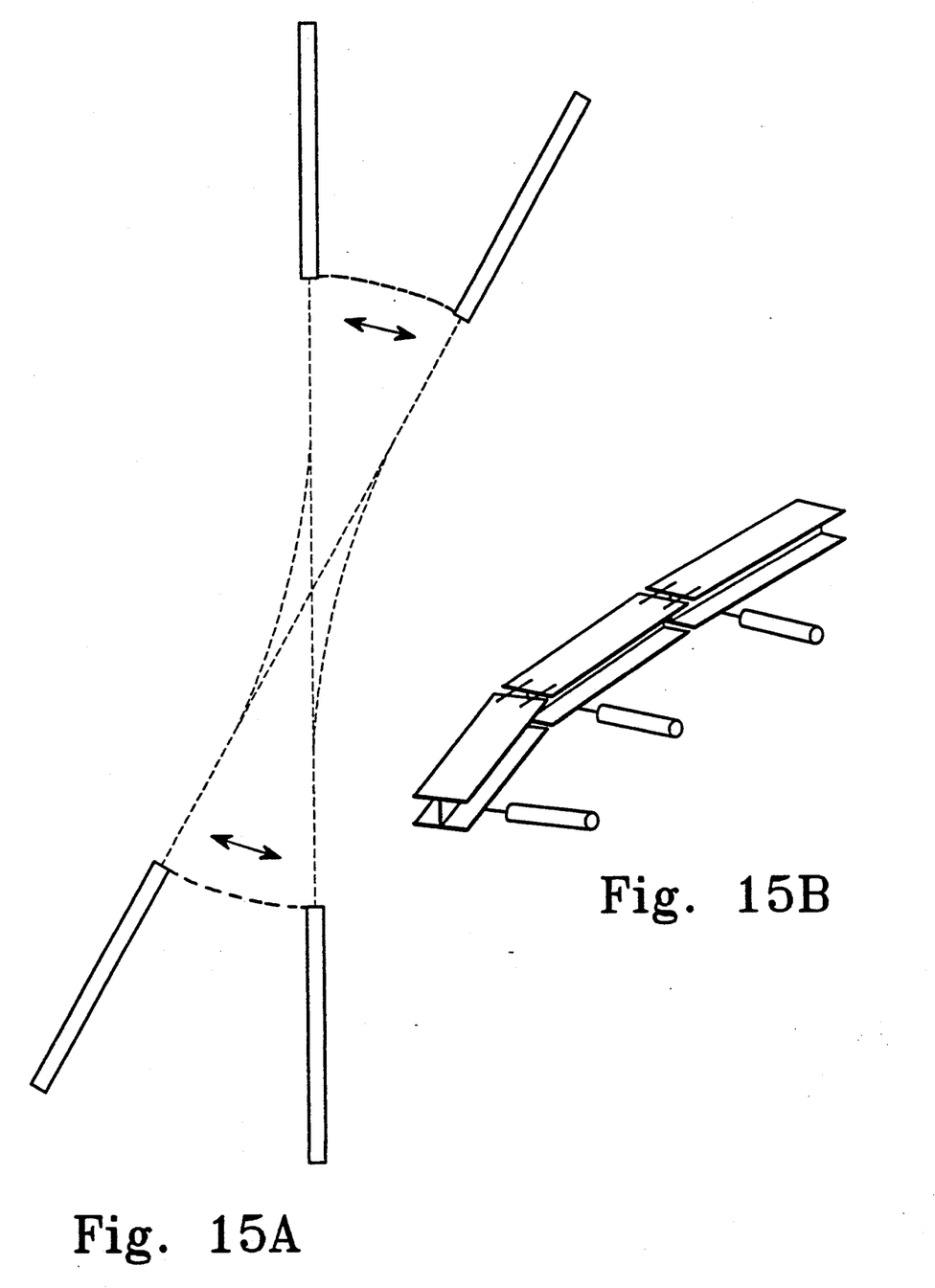
Figure 16:
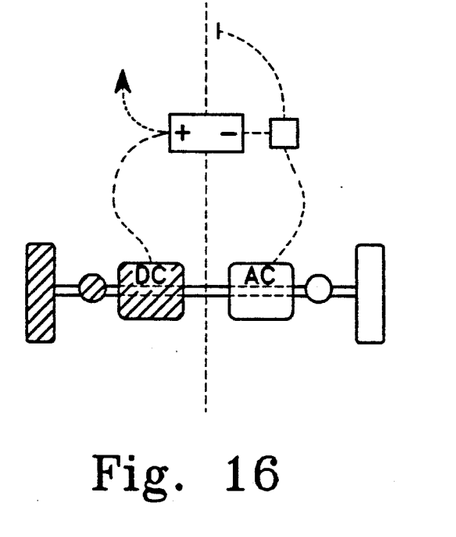
FIG. 16: Diagram of activated DC motor with low gearing in EV power train.
Figure 17:
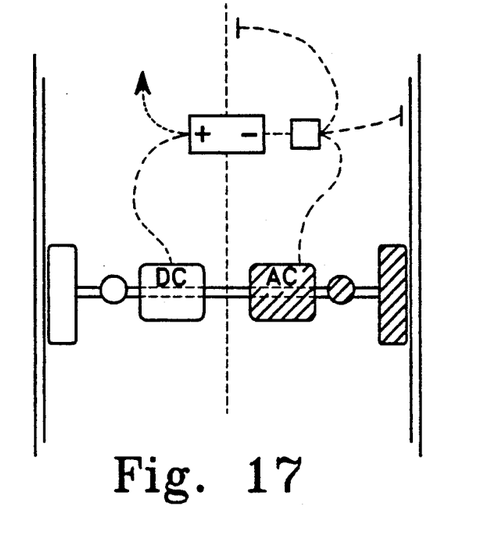
FIG. 17: Diagram of activated AC motor with high gearing.
Figure 18:
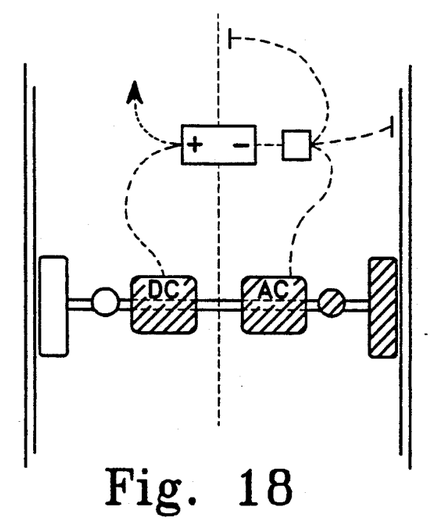
FIG. 18: Diagram of activated AC and DC motor with high gearing.
Figure 19:
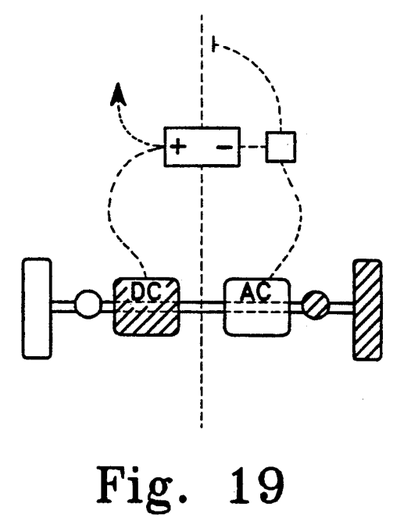
FIG. 19: Diagram of activated DC motor with higher gearing.
Figure 20:
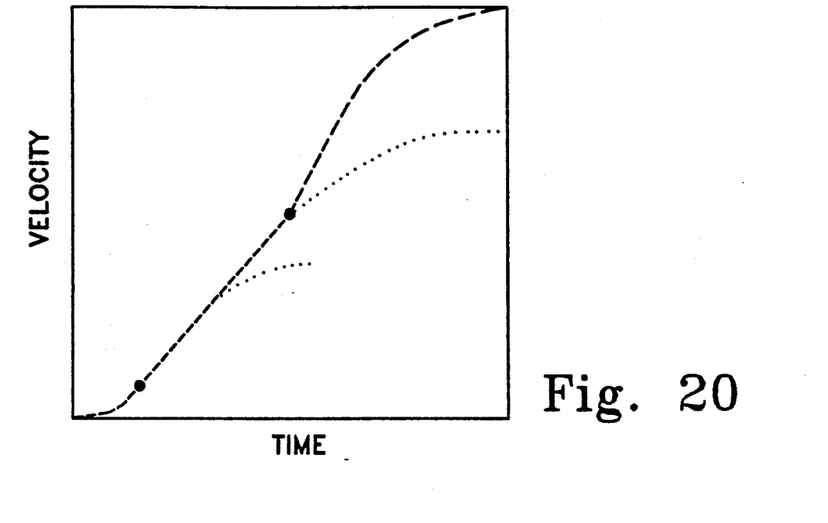
FIG. 20: Theoretical speed curve.
Figure 21A:
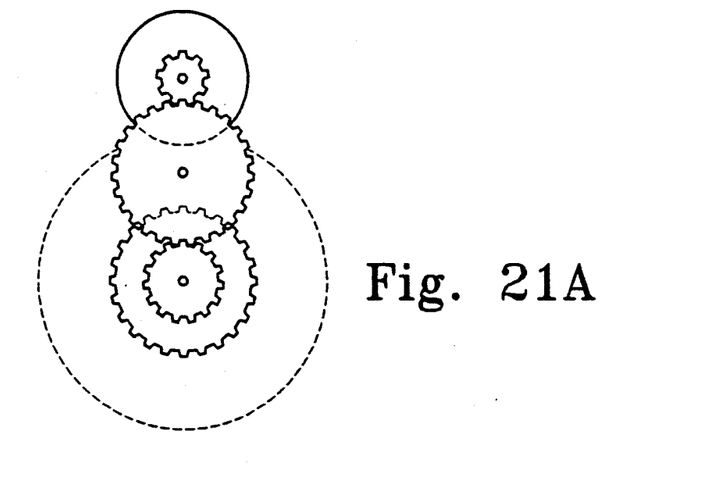
FIG. 21A: Side Elevation showing gearing.
Figure 21B:
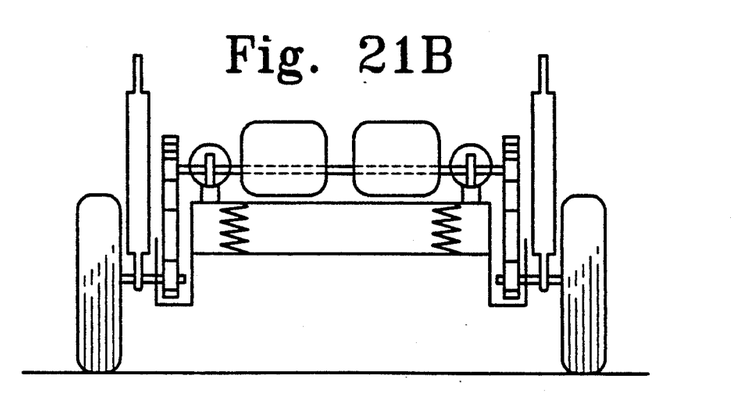
FIG. 21B: Cross section of rear assembly.

An alternative system of counter-rotating wheels might also be employed as shown in FIG. 11 and in a later manifestation the entire vehicle could be propelled by a locomotive unit or powered by magnetic induction.

The guideway itself is a continuous concrete duct with grooves on either side as described. A continuous opening in the top of the duct to permit the passage of the strut support which connects the airfoil with the sled unit and the slot provide space for the support strut that keeps the upper and lower sections in physical and electronic connection. The slot is sealed with a continuous neoprene gasket 18 to stop water and debris accumulating in the duct. The duct is drained and constructed to grades, curves and elevations all in accordance with normal engineering practice. A special automated "janitor unit" will be responsible for cleaning and inspecting the inside of the duct on a regular basis.

At certain locations along the guideway the top the duct is covered by pairs of pivotally grilled plates 20 that pivot along the edge of the opening to provide a set of double access doors. When the doors are in the closed position they lie above the guideway duct except for the continuous narrow slot between the doors. The doors are thus built with a width that allows a small gap to exist between them when they are in the closed position. It is this gap that provides the longitudinal slot in which the support strut or fin rides in.

The duct could be either pre-cast or poured in place reinforced concrete utilizing a sliding form for accuracy of internal dimensions. The duct must be well drained though, because of the continuous gasket, very little water or rubbish should in fact accumulate inside.

At either side of the interior of the duct there are continuous lateral grooves to receive double bearing steel wheels (or counter-rotating wheels) as well as a further groove for connection to a continuous electrical and signals conductor.

The guideways duct would generally follow topographical contours without abrupt slopes in a series of straight sections and gentle curves. Since any slope would change the angle of attack of the airfoil sections, an automatic trim device, triggered from air pressure variations in a Pitot tube, would adjust the angle of attack to the 'relative wind' and the device would similarly control the airfoil to approximate optimum lift. The curves in the system should be gentle and superelevated. The transit duct could use a separate right-of-way or it might utilize lanes of existing expressways. It could be elevated on a separate structure for bridges/overpasses, etc.

It is contemplated that vehicles to be loaded onto the sled would generally be electric powered and standardized with rear wheel drive. The batteries of the vehicles could be continuously recharged from the central guide while in the "piggy-back" mode with the sled unit. The central guide would also pick up signals to control "flight," separation, speed, etc. The sled unit could also be powered by linear magnetic induction, a tractor unit, air pressure, or other means.

But while this application remains for the future, in present terms the invention could also be used to take up present day ICE automobiles onto the upper sled and thus piggyback them to the centralized points.

The EV to be used in conjunction with the guideway should be standardized as to track, width, general dimensions and power output. It should also have as a minimum an audio visual receiver with monitor to pick up and relay signals. The EV should also have instrumentation indicating when the sled is locked into position and unless this condition applies, the articulated unit would be inoperable. Other desirable but not essential instruments would be (1) a combined aileron/elevator/airbrake visual display (2) an attitude instrument showing wing bank and climb. (3) a main voltage gauge and (4) RPM meters for the AC and DC motors as appropriate.

For the guideways system to be fully effective it is important that the EV have sufficient range, power and acceleration as well as the instrumentation noted above. To achieve these attributes, the EV utilizes co-axial belt or chain driven AC and DC motors which are capable of being activated separately or together with high or low gearings. Such an arrangement would permit the DC motor to be used for the stat up of the EV with the low gearing activated, the AC motor would provide the middle range acceleration while for the very high speed travel the DC motor would be reengaged also driving through the high gearing. Such an arrangement would allow a natural torque split that replaces the differential. Another feature that the EV car would share with the German Pohlmann E1 Ev would be the ability to switch motors between series and parallel. For low speeds the DC motor would be connected in series but for higher speeds both motors would run in parallel. The range of the EV would be enhanced by recharging the battery by regenerative braking when free ranging or where there is a roadway AC pickup, the AC power source would also recharge the batteries.

One possible immediate application would be at busy airports by car rental agencies to give customers immediate curbside access to vehicles. The "piggy-backed" vehicles could be disengaged off-airport (or even at a suitable terminal in the city enter). The vehicle, when disengaged, can be used in the conventional mode, as urban transportation. The system could also be used for inter-city transportation.

Operation

Figure 1:
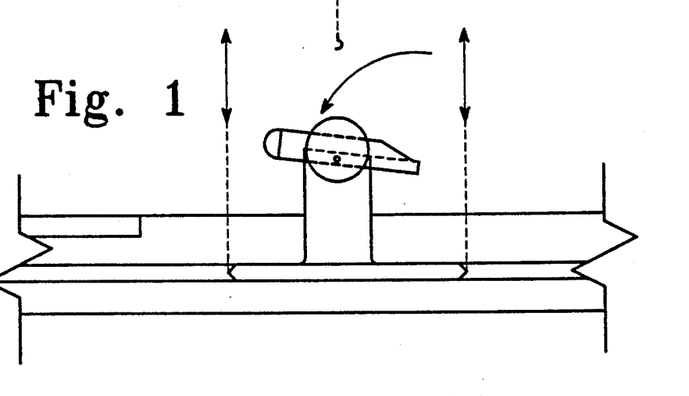
FIG. 1: sled unit shown folded in loading areas of guideway in loading zone
Figure 2:
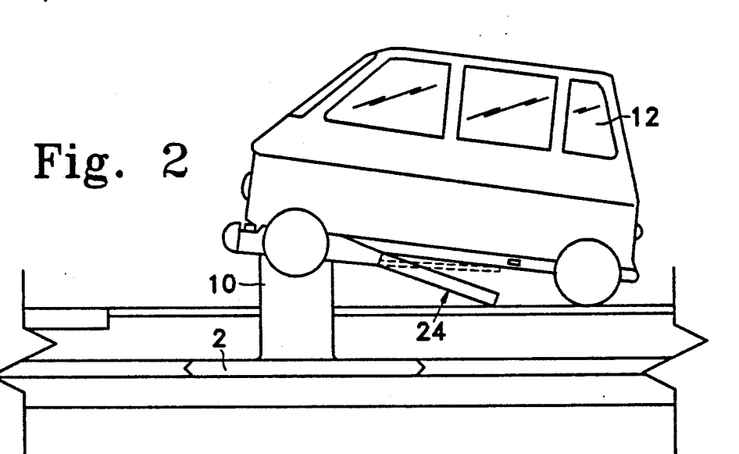
FIG. 2: sled unit in loading position with electric vehicle already mounted by means of integral ramp.
Figure 3:
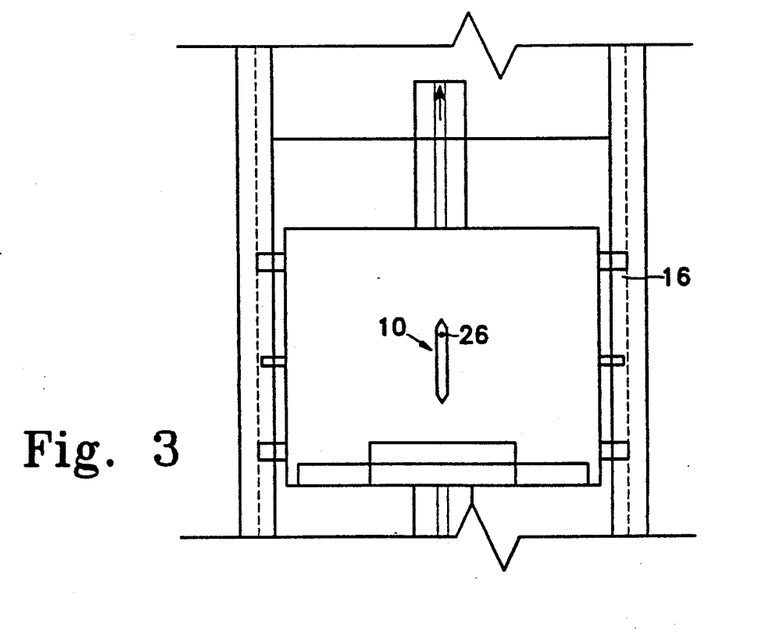
FIG. 3: plan view of airfoil wing in guideway

As the auto drives onto the upper sled unit (carrying sled) a solenoid activated bolt causes the flange located underneath the vehicle to move up and under the vehicle to lock it into connection with the sled. The flange pivots upward as shown in FIG. 2. A position lug 36 is attached to the front underside of the car and it causes the car to effect an electrical and signal connection through the sled into the electrical and signal system of the guideway. The carrying sled has a support strut that extends downward and through a slot in the top of the duct to bring the load bearing portion in mechanical and electrical connection with the guideway mounted lower sled unit (the airfoil section).

Computerized Operation

Once the vehicle is mounted in the piggyback mode, a central computerized signal system controls the movement of the vehicle. Using the on-board motor and the computer and systems, located in the sled, the articulated sled unit and vehicle move along the guideway at a present speed. Besides the central control of separation, at set intervals a mechanical device shuts off power to the motor of a unit if the sled unit triggers the device in less than prescribed time delay. A further safety control is a manual emergency power off/braking function which would only be used in emergencies.

When the vehicle is underway, the driver has no responsibility for the control of the vehicle except to function similar to a pilot when his plane is on autopilot; i.e., regular scan of instruments, check of road, etc. The piggybacked units are pre-programmed to switch as necessary at intersections by the automatic activation of a pin which engages in a slot in a central switch block; the speed will be automatically reduced for non-main line traffic. At the exit node, a buzzer will sound and speed will be reduced gradually until the articulated units come to a stop. At this point, the solenoid locks are disengaged by the driver and the vehicle reverses off the sled unit by way of the in-built ramp. The vehicle is now free to resume conventional travel on the highway system.

The sled unit at this time can be removed from the duct after first folding the ramp into the "stow" position. The sled unit can now be inspected and receive maintenance as appropriate.

Articulated units

This is a variation on the basic invention in which sled units use the same duct but utilize a larger airfoil 'wing' to support a motive unit above. The unit could be articulated or solitary. The motive power could be accommodated either in a special tractor unit or mounted at the rear of the airfoils. Almost any type of motor could be accommodated; the controlled take-off might even have application in use with magnetic levitation.

Mass Transportation Application

This application of the invention is intended to be used with existing and future forms of transportation. This part of the invention addresses the problems of increased speed and capacity of public mass transportation. Also using a guideway of more substantial design the invention is intended to improve the performance of present mass transit systems by permitting multiple use of the transitway by conventional trains, airfoil/ground effect vehicles, tracked hovercraft and vehicles employing magnetic levitation and propulsion. further use of the guideway might be to provide a testing vehicle for airframe experimentation.

Invention as Applied to Mass Transportation

Figure 7:
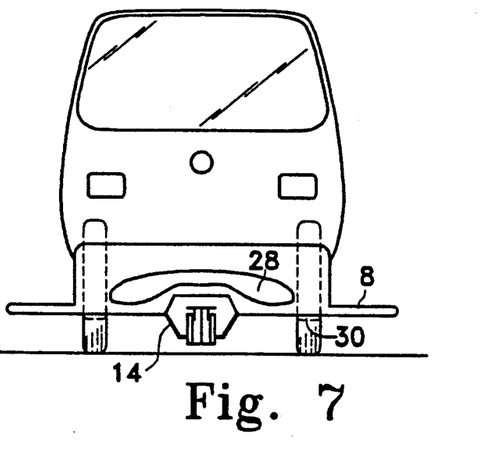
FIG. 7 front view of grade level system showing sled unit mounted on I beam rail.
Figure 8:
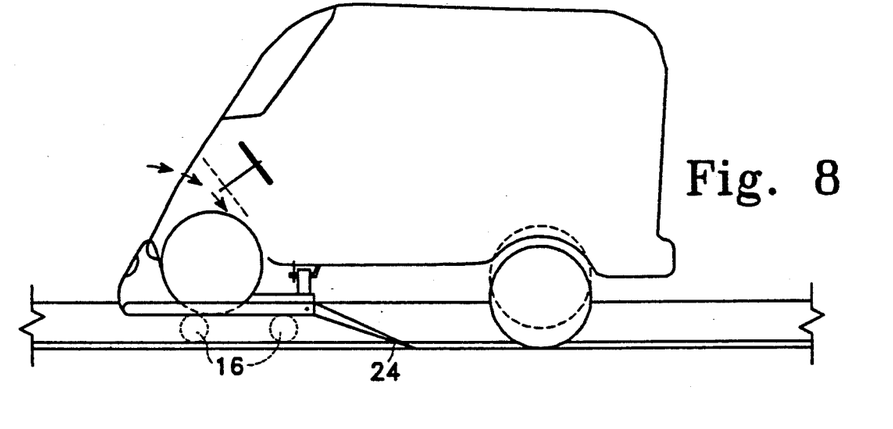
FIG. 8: side view of grade level system showing aileron ramp section for EV to mount sled.
Figure 9:
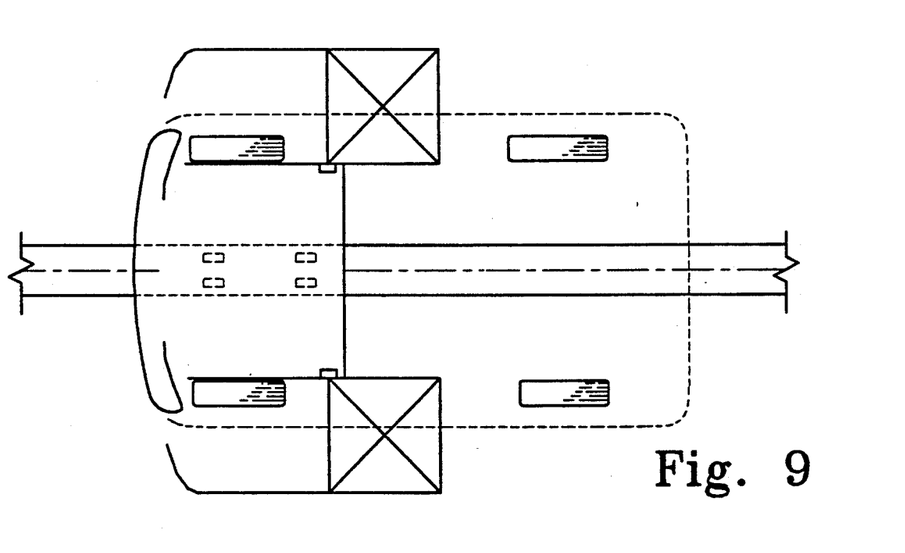
FIG. 9: Plan view of sled showing wheel position of EV.
Figure 10:
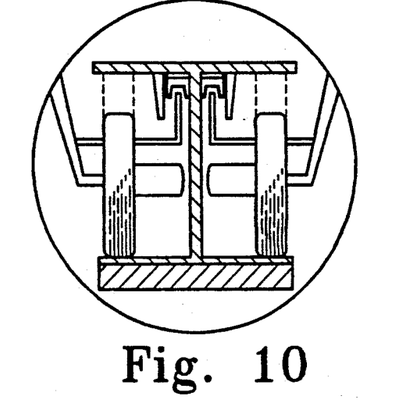
FIG. 10: Section through I beam guideway.

In the application of the invention to a mass transportation the invention would embody the use of continuous c-shaped guideways generally constructed on either side of an existing rail line. The reinforced concrete 'C' section is designed to accommodate counter-rotating wheels as might be employed for conventional motive power but it would also serve as a guideway for tracked hovercraft and maglev vehicles. FIG. 7.

This variation might in reality permit an aircraft to operate in a controlled 'take-off' mode. To carry the idea further, this concept might utilize jet propulsion which would be effectively muffled by the duct. But again, this mode could be powered by any state-of-the-art motor. A variation might even use rotary wings, powered or autogyro-type.

Other Applications

The concept of the guideway can also be extended into future applications that will use future vehicles such applications would include:

High Speed Rail

This application would enable train speeds to be increased by improvements in suspension and derailment avoidance; the guideway would also serve as a continuous sound insulator and with height enhancement could minimize the effects of crosswing and visual intrusion.

Maglev-Type Vehicles

This technology being developed mainly in Japan and Germany seems to be in the threshold of major commercial application; a major problem though seems to be the cost of acquiring the right-of-way and the construction of the track which is calculated by Transrapid of Germany to be about 63% of the total cost of the system. This invention would greatly reduce the cost of the track by utilizing existing railway rights of way (without disturbing their present use for commercial trains). It might even be possible to retrofit some existing rolling stock. With some design changes a version of the Transrapid could be made to operate on the guideway illustrated herein. See FIG.

Wide Bodied Trains

Using the guideways as outriders in connection with the existing railway track, it would be possible to develop a wide-bodied rail car for certain high density commuter routes.

Tracked Hovercraft

Using the existing rails as skids for slow speed and "rest" mode, this application of the guideway would permit air-cushion vehicles access to the main transportation network; yet the hovercraft might be amphibious in certain situations which would obviate the necessity for bridges, etc. and could open up great areas of wetlands and delta terrain presently uneconomic to serve with conventional transport.

Airfoil "ground effect" vehicles

This application would utilize an airfoil to benefit from the lift force afforded by "ground effect"; friction would be minimized by the application of counter-rotating wheels in a streamlined cowling. The wing section, construction and controls would be similar to aeronautical practice.

Captive Airframe Experimentation

The guideway would lend itself to numerous scientific uses; an obvious application be to test airframes in simulated flight conditions.

I claim:

1. A transit system for transporting vehicles to and from nodal points comprising: track in connection with said nodal points, said track having a continuous duct, said duct having left and right walls, each of said walls having a groove on the interior side of each said wall, said grooves running parallel to one another and running the length of said track, said duct having a top wall with a central aperture running the length of said groove, wing of aerodynamic shape for movement within said duct, said wing having rotating means on the left and right sides of said wing, said rotating means for contacting said grooves strut means in connection with said so that said strut protrudes through said central aperture, sled means in connection with said strut and located above said top wall, said sled having means for attachment to vehicles for transport along said system.

2. The systems of claim 1 where said sled is of aerodynamic shape.

3. The system of claim 2 where said sled has means for attaching to the front wheels of said vehicles.

4. The system of claim 3 wherein said vehicles have AC and DC motors individually geared, so that said motors may operate individually or together.

* * * * *